US010545958B2

(12) United States Patent
Azzam et al.

(10) Patent No.: US 10,545,958 B2
(45) Date of Patent: Jan. 28, 2020

(54) LANGUAGE SCALING PLATFORM FOR NATURAL LANGUAGE PROCESSING SYSTEMS

(71) Applicant: MICROSOFT TECHNOLOGY LICENSING, LLC, Redmond, WA (US)

(72) Inventors: Saliha Azzam, Redmond, WA (US); Gaurav Agarwal, Seattle, WA (US); Tu Huy Phan, Redmond, WA (US); Nicholas Van Joseph Caldwell, Redmond, WA (US); Ahmed Mohamed Elbahtemy, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 327 days.

(21) Appl. No.: 14/715,372

(22) Filed: May 18, 2015

(65) Prior Publication Data
US 2016/0342597 A1 Nov. 24, 2016

(51) Int. Cl.
*G06F 16/2452* (2019.01)
(52) U.S. Cl.
CPC .............................. *G06F 16/24522* (2019.01)
(58) Field of Classification Search
None
See application file for complete search history.

(56) References Cited

U.S. PATENT DOCUMENTS

| 7,209,876 | B2 | 4/2007 | Miller et al. |
| 7,249,013 | B2 | 7/2007 | Al-Onaizan et al. |
| 7,672,831 | B2 | 3/2010 | Todhunter et al. |
| 7,720,856 | B2 | 5/2010 | Goedecke et al. |

(Continued)

OTHER PUBLICATIONS

Dagan, et al., "Word Sense Disambiguation Using a Second Language Monolingual Corpus", In Journal of Computational Linguistics, vol. 20, Issue 4, Dec. 1994, pp. 563-596.
(Continued)

*Primary Examiner* — Mark D Featherstone
*Assistant Examiner* — Tony Wu
(74) *Attorney, Agent, or Firm* — Shook, Hardy & Bacon, L.L.P.

(57) ABSTRACT

In various embodiments, methods and systems for language scaling a natural language processing system (NLPS) are provided. A database schema of a database is accessed. The database schema includes entities that are defined in a query natural language different from an NLPS natural language upon which NLPS components are built. The entities are communicated to a machine translation service and top translations. A translated database schema model is generated based on the entities and translations. When a query associated with the query natural language and the database schema is received, a query translation is generated. The query translation comprises selectively translated portions of the query based on a selective translation mechanism that includes accessing the machine translation service to translate selected portions of the query. The selected portions are (Continued)

selected based on the translated database schema. The query translation is executed on the NLPS components to identify query results.

20 Claims, 6 Drawing Sheets

(56) References Cited

U.S. PATENT DOCUMENTS

| | | | |
|---|---|---|---|
| 8,615,388 B2 | 12/2013 | Li et al. | |
| 8,631,010 B1* | 1/2014 | Gravano | G06F 17/30864 |
| | | | 707/736 |
| 8,713,037 B2 | 4/2014 | Nikoulina et al. | |
| 8,775,154 B2 | 7/2014 | Clinchant et al. | |
| 2004/0122656 A1* | 6/2004 | Abir | G06F 17/2872 |
| | | | 704/4 |
| 2006/0184561 A1* | 8/2006 | Terada | G06F 17/303 |
| 2007/0282594 A1 | 12/2007 | Spina | |
| 2008/0319962 A1 | 12/2008 | Riezler et al. | |
| 2009/0248422 A1 | 10/2009 | Li et al. | |
| 2010/0145673 A1 | 6/2010 | Cancedda | |
| 2011/0172987 A1* | 7/2011 | Kent | G06F 17/241 |
| | | | 704/3 |
| 2012/0330919 A1 | 12/2012 | Chen et al. | |
| 2012/0330990 A1* | 12/2012 | Chen | G06F 17/28 |
| | | | 707/761 |
| 2013/0073276 A1 | 3/2013 | Sarikaya et al. | |

OTHER PUBLICATIONS

Agiza, et al., "An English-to-Arabic Prototype Machine Translator for Statistical Sentences", In Intelligent Information Management, Jan. 2012, pp. 13-22.

Marcu, et al., "SPMT: Statistical Machine Translation with Syntactified Target Language Phrases", In Proceedings of the Conference on Empirical Methods in Natural Language Processing, Jul. 2006, pp. 44-52.

"NLP Projects at Reykjavik University", Retrieved on: Oct. 8, 2014 Available at: http://nlp.cs.ru.is/projects.htm.

* cited by examiner

LANGUAGE SCALING PLATFORM FOR NATURAL LANGUAGE PROCESSING SYSTEMS

BACKGROUND

Natural language processing systems support interactions between computers and human natural languages. In particular, natural language processing systems facilitate deriving meaning from natural language inputs and generating results and sometimes natural language outputs. Natural language processing systems can be implemented in search engines to support finding targeted answers to user natural language queries. Natural language processing systems can be developed with heuristics around verbs, phrases, and clauses such that query results to a natural language query can be based on understanding the nature of the question and searching and returning the most relevant query results. Developing such heuristics and the corresponding natural language processing system components for executing natural language queries usually requires a significant amount of effort.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein methods, computer-storage media, and systems for language scaling a natural language processing system (NLPS). At high level, language scaling an NLPS refers to increasing the number of languages that an NLPS can support. A database schema of a database comprising entities is accessed. The entities are defined in a query natural language different from an NLPS natural language upon which the NLPS components are built. The entities can include table names and column names of the database schema. The entities are communicated to a machine translation service to receive a number of top translations for each corresponding entity. A translated database schema model is generated, where the translated database schema model comprises the entities and entity translations, such that, a query is executed for query results in the database based on the translated database schema model.

In operation, the query that is associated with the query natural language and the database schema is received. A determination that the query language is different from the NLPS natural language is made. A query translation is generated for the query, where the query translation comprises selectively translated portions of the query based on a selective translation mechanism that includes accessing the machine translation service to translate selected portions of the query. The selected portions are selected based on the translated database schema and instance values of the database. The query translation is executed on the NLPS to identify query results, where the query results are generated based on NLPS components.

BRIEF DESCRIPTION OF THE DRAWINGS

The present invention is described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion below, embodiments are described with reference to a language scaling platform associated with a cloud computing infrastructure; the language scaling platform can implement several components for performing the functionality of embodiments described herein. Components can be configured for performing novel aspects of embodiments, where "configured for" comprises "programmed to" perform particular tasks or implement particular abstract data types using code. It is contemplated that the methods and systems described herein can be performed in different types of operating environments having alternate configurations of the functional components. As such, the embodiments described herein are merely exemplary, and it is contemplated that the techniques may be extended to other implementation contexts.

Natural language processing systems support interactions between computers and human natural languages. In particular, natural language processing systems facilitate deriving meaning from natural language inputs and generating results and sometimes natural language outputs. Natural language processing systems can be implemented in search engines to support finding targeted answers to user natural language queries. Natural language processing systems can be developed with heuristics around verbs, phrases, and clauses, such that, query results to a natural language query are based on understanding the nature of the question and searching and returning the most relevant query results.

Developing such heuristics and the corresponding natural language processing system components for executing natural language queries usually necessitates significant software engineering effort. Moreover, extending a natural language system to additional languages may include additional development activities, which conventionally have included rewriting all of the language specific components and patterns or building an entire parallel system. Depending on the scope of the natural language processing system, such conventional solutions can be impractical, if not impossible. A platform, that supports users entering natural language queries in a query language (e.g., French) that is different from a natural language of a natural language processing system (e.g., English) that executes the query, can leverage the existing natural language processing system components, and heuristics therein, with several advantages over conventional solutions discussed above.

Embodiments described herein provide simple and efficient methods and systems for language scaling natural language processing systems based on a language scaling platform. The language scaling platform refers to a plurality of language scaling components that facilitate leveraging natural language processing ("NLPS") components for executing queries (e.g., natural language queries) entered in a query language (e.g., French) but executed against an NLPS built in an NLPS language (e.g., English). The language scaling platform can specifically utilize a language translation component (e.g., machine translation service component) in generating a translated database schema of the database being searched to generate query results while using heuristics and additional features built in NLPS components in the NLPS natural language.

In operation, an NLPS can be scaled based on a language scaling framework that comprises a database adaptation phase (or database schema translation phase), a query translation phase, and a translated query processing phases. The database adaptation phase includes generating a translated database schema model for a database schema of a database based on translating entities of the database schema from a natural language of the database schema to a NLPS natural language. In particular, a top predetermined number of entity translations can be determined for each entity and associated with a corresponding entity in the natural language. The entities in the natural language and the corresponding top predetermined number of translations can be stored in a lookup data structure for accessibility when the query is executed. As such, a query in a query natural language be executed using the NLPS components in the NLPS language.

The query translation phase includes generating a translated query (or query translation) using portions of the query that are selectively translated to generate a hybrid utterance. In particular, selected portions of queries are translated from the query natural language to the NLPS natural language to use the NLPS components to execute the query. Selective translation of queries can be based on a translated database schema model of the corresponding database which is being queried, where entities and instance values can be used to determine portions of the query to be translated or excluded from translation. Specifically, terms or token in the query that match entities and instance values, of the translated database schema and database, can be excluded from translation, as discussed herein in more detail.

The translated query processing phase includes generating query results using NLPS components that execute the translated query. In particular, the NLPS components can be leveraged for a translated query to provide a number of different services based on the NLPS components. The NLPS components can support interpretation services (e.g., term analysis, text extraction, syntax analyzer, and semantic analyzer), query services, and entity mapping that are executed for the translated query to improve the querying process and also to improve query results generation, as described herein. It is contemplated that traditional features of NLPS component beyond those enumerated above can be applied the translated query during the translated query processing phase.

Accordingly, the languages scaling framework can support at least three different types of query scenarios that leverage NLPS components to execute queries based on the language scaling platform. By way of illustration, a first query scenario includes: a French query executed against a French database, where the French database comprises a translated database schema model, such that, the French query is executed using English NLPS components, the French query is selectively translated to an English query; a second query scenario where a French query is executed against an English database using the English NLPS components, the French query is selectively translated to an English query; and in a third query scenario, an English query is executed against a French database, where the French database schema is adapted to a translated database schema model to use the English NLPS components.

The functionality of the language scaling platform can be performed using language scaling platform components. The language scaling platform components refer to the hardware architecture and software framework that support generating translated database schema models and translated queries utilized in the language scaling platform. The hardware architecture refers to physical components and interrelationships thereof and the software framework refers to software providing functionality that can be implemented with hardware for language scaling an NLPS. In particular, the software framework can be on a cloud computing platform that operates computer hardware to provide natural language processing for queries in different languages. By way of example, the language scaling platform can include an API library that includes specifications for routines, data structures, object classes, and variables may support the interaction the hardware architecture of the device and the software framework. These APIs include configuration specifications for the language scaling platform to support language scaling natural language processing systems.

Accordingly, in a first embodiment described herein, a system for language scaling natural language processing systems is provided. The system includes a database schema adaptation component configured for accessing a database schema of a database, the database schema comprising entities, where the entities are defined in a query natural language different from a natural language processing system (NLPS) natural language; communicating the entities to a machine translation service; receiving translations for the entities from the machine translation service, where the translations correspond to top translations for the entities; and generating a translated database schema model, where the translated database schema model comprises the entities and corresponding translations.

The system includes a query component configured for: accessing a query, where the query is defined in the query natural language that is different from the NLPS natural language; generating a translated query, wherein the translated query comprises selectively translated portions of the query based on a selective translation mechanism that includes communicating with the machine translation service to translate selected portions of the query; and executing the translated query on a natural language processing system to identify query results, where the query results are generated based on NLPS components in the NLPS language and the translated database schema model.

In a second embodiment described herein, one or more computer storage media having computer-executable instructions embodied thereon that, when executed, by one or more processors, causes the one or more processors to perform a method for language scaling natural language processing systems (NLPS). The method includes accessing a database schema of a database, the database schema comprising entities, where the entities are defined in a query natural language different from a natural language processing system (NLPS) natural language, where the entities comprise table names and column names of the database schema. The method also includes communicating the entities to a machine translation service. The method further includes receiving a predetermined number of translations for each corresponding entity from the machine translation service, where the translations include top translations for the entities. The method further includes generating a translated database schema model, where the translated database schema model comprises the entities and corresponding translations such that a query is executed for data in the database based on the translated database schema model.

In a third embodiment described herein, a computer-implemented method for language scaling natural language processing systems (NLPS) is provided. The method includes accessing a query, where the query is associated with a query natural language and a database schema of a database. The method also includes determining whether the query language is different from an NLPS natural language, where when the query natural language is different from the NLPS natural language a translated query is generated, where the translated query comprises selectively translated portions of the query based on a selective translation mechanism that includes accessing the machine translation service to translate selected portions of the query based on the database schema. The method includes executing the translated query on a natural language processing system to identify query results, where the query results are generated based on NLPS components in the NLPS language and the database schema.

Figure 1A:
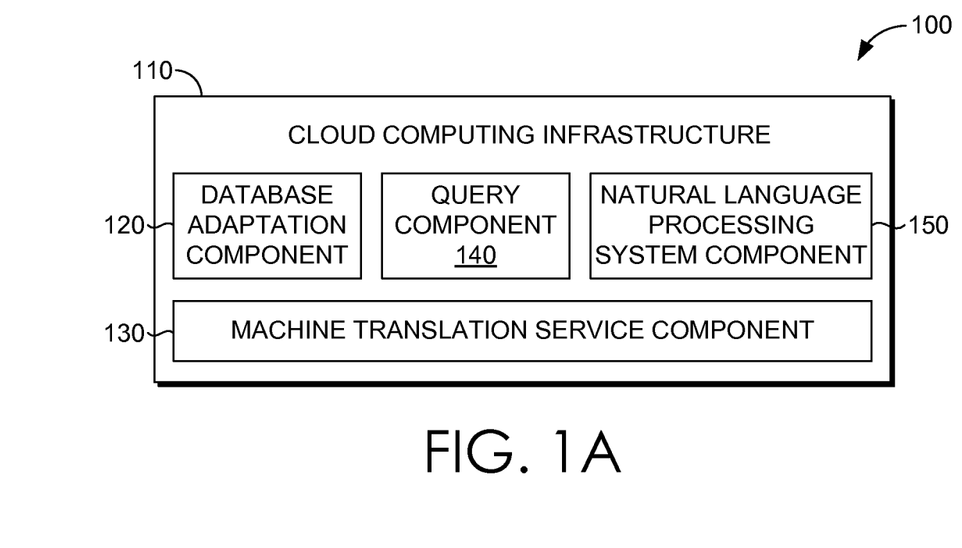
FIGS. 1A and 1B are block diagrams of an exemplary operating environment in which embodiments described herein may be employed.

Referring now to FIG. 1A, FIG. 1A illustrates an exemplary language scaling platform system 100 in which implementations of the present disclosure may be employed. In particular, FIG. 1A shows a high level architecture of language scaling platform system. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Language scaling platform system 100 can be implemented to leverage natural language processing system ("NLPS") components. Language scaling platform system can include a computing platform with components (e.g., a hardware architecture and software framework) that facilitate generating translated database schema models, translated queries, and translated query processing, where a query language is different from the NLPS language. In operation, a database schema of a database is accessed, where the database schema includes entities that are defined in a query natural language different from an NLPS natural language upon which NLPS components are built. The entities are communicated to a machine translation service that generates top translations for entities of the database schema. A translated database schema model is generated based on the entities and translations. When a query associated with the query natural language and the database schema is received, a query translation is generated. The query translation comprises selectively translated portions of the query based on a selective translation mechanism that includes accessing the machine translation service to translate selected portions of the query. The selected portions are selected based on the translated database schema. The translated query is executed on the NLPS components to identify query results.

Among other components not shown, language scaling platform system 100 includes a cloud computing infrastructure 110 having a database adaptation component 120, a machine translation service component 130, a query component 140, and a natural language processing system (NLPS) component 150. The cloud computing infrastructure 110 can support hardware inventory that includes different types of computing devices, each computing device resides on any type of computing device, which may correspond to computing device 500 described with reference to FIG. 5, for example. The components of the language scaling platform system 100 may communicate with each other over a network, which may include, without limitation, one or more local area networks (LANs) and/or wide area networks (WANs). Any number of nodes (e.g., servers) and client computing devices may be employed within the language scaling platform system 100 within the scope of implementations of the present disclosure.

The language scaling platform system 100 may be supported by the cloud computing infrastructure 110. For example, the cloud computing infrastructure 110 can implement components of the language scaling platform system 100 as a service in the cloud computing infrastructure 110. It is contemplated that components of the language scaling platform system 100 can also be implemented independently of the cloud computing infrastructure 110. The cloud computing infrastructure 110 can include racks and clusters that define nodes that are utilized to store and provide access to data in the storage and compute of cloud computing infrastructure. The cloud computing infrastructure 110 may be a public cloud, a private cloud, or a dedicated cloud. The cloud computing infrastructure 110 may include a datacenter configured to host and support operation of endpoints in a particular application or service. The phrase "application" or "service" as used herein broadly refers to any software, or portions of software, that run on top of, or accesses storage and compute devices locations within, a datacenter.

Having described various aspects of the language scaling platform system 100, it is noted that any number of components may be employed to achieve the desired functionality within the scope of the present disclosure. Although the various components of FIG. 1A are shown with lines for the sake of clarity, in reality, delineating various components is not so clear, and metaphorically, the lines may more accurately be grey or fuzzy. Further, although some components of FIG. 1A are depicted as single components, the depictions are exemplary in nature and in number and are not to be construed as limiting for all implementations of the present disclosure.

Figure 1B:
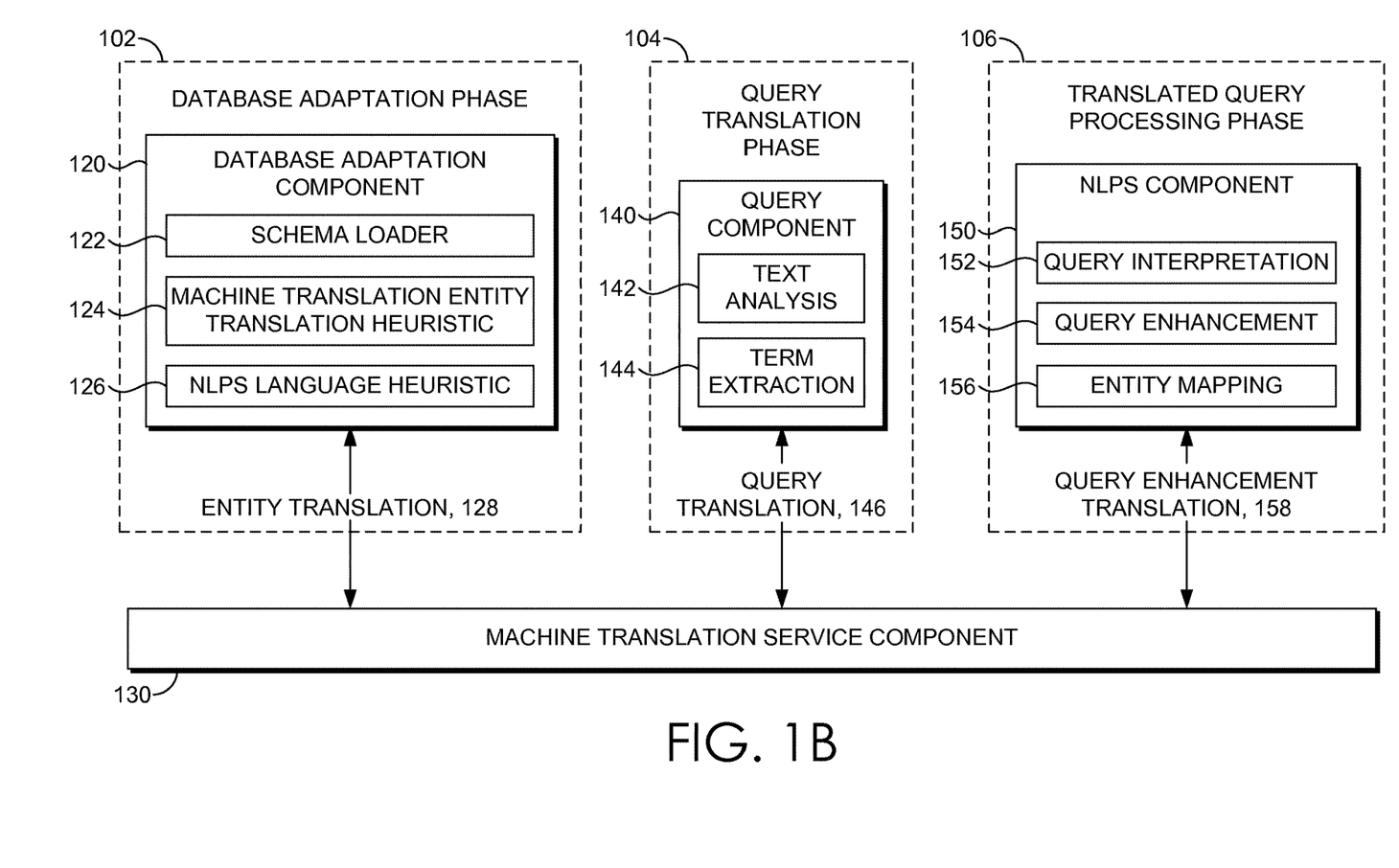

With reference to FIG. 1B, FIG. 1B includes the language scaling framework 100B of the language scaling platform system 100. The language scaling framework 100B and functionality supported therein can be described by way of an exemplary operating environment. The language scaling framework 100B includes database adaptation phase 102, query translation phase 104, and translated query processing phase 106, the database adaptation component 120, the machine translation service component 130, the query component 140, and the natural language processing system (NLPS) component 150. Each component comprises additional components (e.g., schema loader 122, machine translation entity translation heuristic 124, NLPS natural language heuristic 126; text analysis 142 and term extraction 144; and query interpretation 152, query enhancement 154, entity mapping 156) depicted therein, that support functionality thereof as described herein. Each component can implement portions of a language scaling platform system 100A to support functionality of the language scaling platform system 100A.

The database adaption component 120 is responsible for accessing database schemas and adapting the database schema to generate translated database schema models. A database can generally refer to an organized collection of data. A database can be supported by a database management system that facilitates interacting with a user and other applications to access data captured and analyzed in the database. A database can be associated with a database schema that is the structure of the database described in formal language supported by the database management system. In particular, the database schema can refer to a relational model of data organization of entities—a single person, place, or thing about which data can be stored—in one or more tables (e.g., relations) of rows and columns. Generally, each entity type described in a database can have one or more table, the rows representing instances of that entity and the column representing instance values describing each instance. Entities as used herein can refer to identified entities that can include entity names, table names and column names in the database schema.

Adapting a database comprises translating a database schema to a translated database schema model that facilitates language scaling an NLPS. Conventionally, databases can be built based on different natural languages and the database schema entities are usually in the natural language of the database. A schema loader 122 can access a database schema and identify entities within the database schema. Adapting the database schema further includes translating the entities of the database schema from a query natural language to an NLPS language, such that, the NLPS components can be used to execute queries against the database. The NLPS executes the query based on the translated database schema model. The translated database schema model can be a representation of translated entities of the database schema that are relevant to identifying instances, within the database, that facilitate generating a search result. The database schema model structure can include associations between original entities and translated entities that are referenced during query execution to find instances that are responsive to the query. It is worth noting that the instances in the database can remain the natural language of the database.

The database adaption component 120 can access the entities of a database schema being translated and communicate the entities to the machine translation service 130. It is contemplated that entities can be normalized to format the entities into a normal form for the machine language service translation. The normal form can refer to a predetermined standard or common type for representing entities before communication to the machine translation service component. The entities can also be prepared for the machine translation based on a machine translation entity translation heuristic. One such machine translation entity translation heuristic can refer to replacing delimiters with spaces, splitting tokens, optionally adding context words for better translation. The one or more results the machine translation entity translation heuristic process can be combined in one payload and communicated to the machine translation service component 130. The results from machine translation service component along with original entities, their normal forms can be the new entity set that is communicated to the database adaptation component 120.

The machine translation service component 130 is responsible for accessing the database schema entities and generating translations. The machine translation service component 130 can receive an entity from the database adaption component 120 and translate the entity from the natural language, in which the entity is defined, to a natural language of an NLPS. In embodiments, a predetermined number of translations are generated. The predetermine number of translations can include the top translations for each entity. It is contemplated that translations can result in alternate meanings for entities; however the alternate means can be captured and managed through the NLPS that includes components configured for processing semantic elements in the of entities in the translated database schema model. The machine translation service component 130 communicates 128 the translations to the database adaption component 120.

The database adaption component 120 is further responsible for receiving the entity translations, such as, the predetermined number of translations and performing NLPS natural language heuristic operations. The NLPS natural language heuristic operations refer to the application of heuristic rules of the NLPS natural language to the translated database schema and specifically entity translations, using NLPS components. Heuristic rules can include entity synonym rules and phrasing rules that define additional features or dimensions for the translated entities. In particular, phrasing can be based on whether the entity is a noun, verb, adjective, or preposition. Other variations and combinations of NLPS natural language heuristics are contemplated to be applied to the translated database schema to improve the capacity of the translated database schema to generate relevant query results.

The query component 140 is responsible for facilitating executing a query while leveraging the NLPS components. The query component can leverage NLPS components based on selectively translating portions of a query based on a selective translation mechanism described herein. The query component 140 can access a query that is associated with a query natural language and a database schema. The query natural language can be a detected natural language in which the terms of the query are entered. The query natural language can also be the intended natural language of a user entering the query. It is contemplated that the query natural language can be the natural language of the database schema that includes the data being queried.

The query component 140 can determine whether the query natural language is different from an NLPS natural language. The NLPS natural language refers to the natural language for which the NLPS components are defined for processing queries. In this regard, when the query natural language is different from the NLPS natural language a translated query is generated. In particular, the translated query includes selectively translated portions of the query based on accessing a machine translation service to translate the portions of the query selected for translation. The query translation can be executed on NLPS components that are defined in a natural language different from the original natural language of the query.

It is contemplated that query natural language may not be different from the NLPS natural system; however, the query can be executed on a translated database schema model. In this regard, even though the query natural language and the NLPS natural language are the same, a natural language that defines the database schema is different from the NLPS natural language. Using the database adaption component 120, the database schema can be translated into a translated database schema mode such that a query in a different natural language than the original database schema can be executed to identify query results in the database.

Accordingly, the query component 140 can facilitate three different types of query scenarios that leverage NLPS components to execute queries based on the language scaling platform. By way of illustration, a first query scenario includes: a French query executed against a French database, where the French database comprises a translated database schema model such that the French query is executed using English NLPS components, the French query is selectively translated to an English query using the translated database schema model; a second query scenario where a French query is executed against an English database using the English NLPS components, the French query is selectively translated to an English query using an English database schema; and in a third query scenario, an English query executed against a French database, where the French database schema is translated to a translated database schema model to use the English NLPS components.

The query component 140 is responsible implementing the query translation phase 104 to generate a query translation based on selective query translation mechanism that facilitates language scaling natural language processing system. In operation, a query in a query natural language can be translated based on a database schema. In particular, the query can be translated using a database schema model, although similar operations apply when the translation is performed using a database schema. The query component 140 can receive a query and identify portions of the query that are selected for translation to generate the translated query. The query component 140 includes text analysis 142, a component that performs text analysis that includes tokenization of the query from a stream of text into words, phrases, symbols or other meaningful elements referred to as tokens. Additional text analysis can also include spelling correction and stemming that include process of reducing inflected or derived works to their word stem, base, or root form. Other variations and combinations of text analysis are contemplated with embodiment described herein.

The query component 140 can also include term extraction 144, a component that performs term extraction that refers to extracting relevant tokens or terms from the query. In particular, the query component 140 can access a translated database schema model and compare the tokens to the database schema model to identify matching tokens between the translated database schema model and the query to exclude the matching tokens from translation. Further, the tokens are also compared against instance values in the database schema such that tokens that match instance values are excluded from translation.

Upon extracting tokens that match entities (e.g., entity names, table names, column names) and instance values, a language scaling query comprising a query and a dynamic dictionary of the query can be generated and communicated to the machine translation service component. The language scaling query can be communicated in a markup language (e.g., Extensible Markup Language XML) that defines a set of rules for encoding the query and the dynamic dictionary elements. In particular, the language scaling query can indicate the portions that do not need translation by the machine translation service based on a first set of rules and the portions that need translation based on a second set of rules.

The machine translation service component 130 can be configured to receive the language scaling query comprising the query and the dynamic dictionary and translate the portions of the language scaling query identified for translation. The machine translation service component can translate the language scaling query and communicate 146 the language scaling query to the query component.

The query component can also generate a translated query as a hybrid utterance using the language scaling query. It is also contemplated that the query component can also generate the hybrid utterance based on alignment information obtained from machine translation service component 130. Alignment information can refer to how each word in the translation aligns with the original word position. The machine translation service component can be configured to translate the entire language scaling query and request additional alignment metadata. This metadata can include how each word in translation aligns with original word positions and how the alignment information may be out of order. The query component can then selectively replace or reverse words, in particular some words are reversed to their original form.

The NLPS component 150 is responsible for implementing a translated query processing phase 106. Specifically, the NLPS component can perform NLPS operations on the translated query as if the query were received in the NLPS natural language. In this regard, the translated query can be processed on query interpretation 152 and query enhancement 154 components of the NLPS component 150. By way of example, query interpretation 152 includes text analysis, term extraction, syntax analysis, and semantic analysis to generate interpretations for the translated query. Further, query enhancement 154 can include receiving interpretations of the translated query and processing the interpretation to generate restatements, autosuggestion, and unrecognized terms. The NLPS component 150 communicates the query enhancement results to the machine translation service 130 for translation to the query natural language and the machine translation service component 130 communicates 158 the query enhancement translations to the NLOS component 150 for additional processing to generate query results. Other variations and combinations of query interpretation and query enhancements are contemplated with embodiments described herein.

The natural language processing component can implement entity mapping 156 to facilitate generating query results responsive to the query. In the database adaption phase, a translation map of entities can be persisted and can then be used in combination with machine translation service to map NLPS query results (restatements, autosuggestions etc.) back to database schema language and/or query language. Query results can be generated based on executing the translated query using the translated database schema and the NLPS components and heuristics therein.

Figure 2:
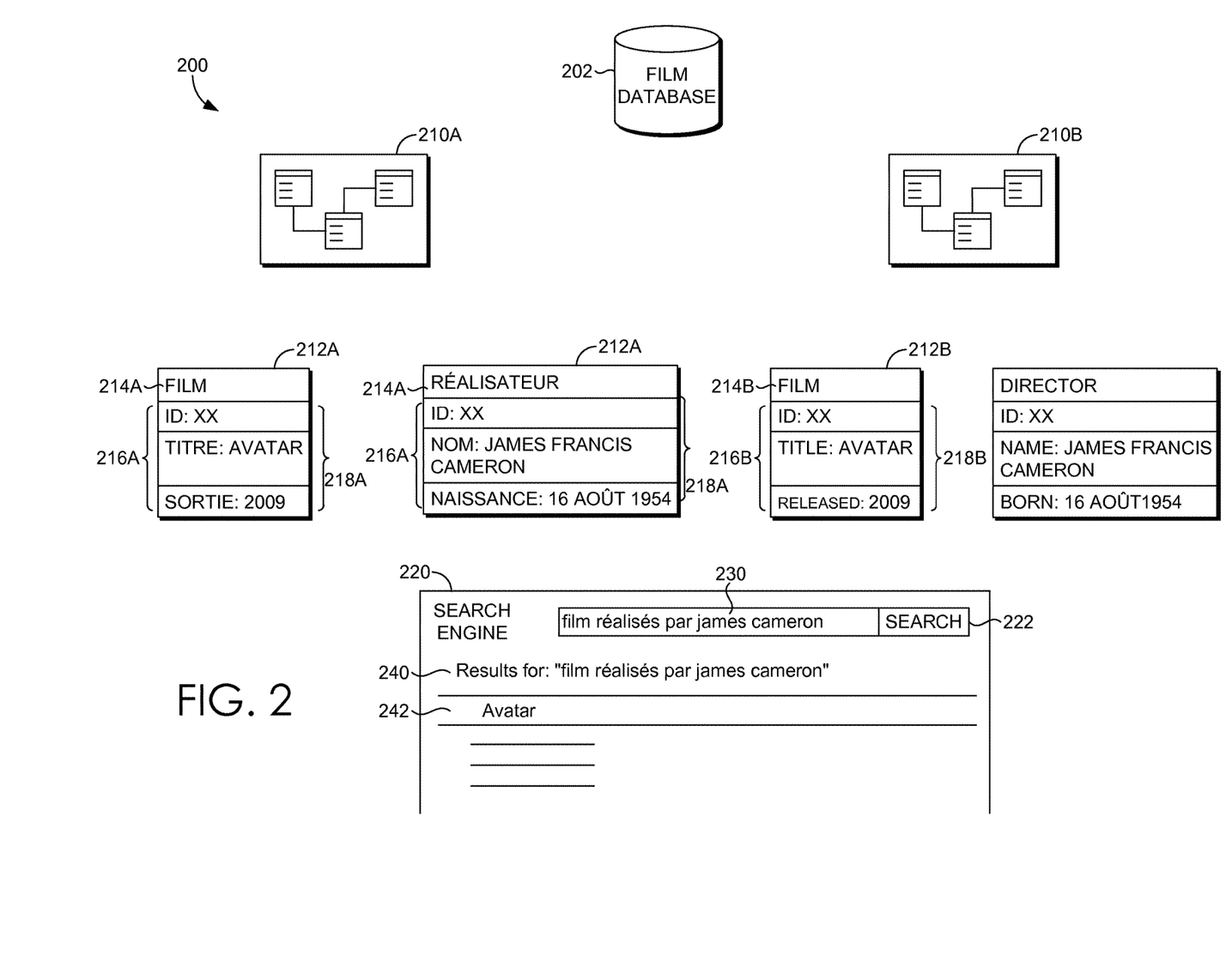
FIG. 2 is a schematic of an exemplary implementation of a language scaling platform, in accordance with embodiments described herein.

Turning now to FIG. 2, FIG. 2 illustrates an exemplary implementation of the language scaling platform 200. A film database 202 to support French speakers can be defined using a French database schema 202. The film database can be adapted for language scaling an NLPS based on translating entities defined in the film database from French to English. As such, the NLPS can support executing queries on the database using English NLPS components. Specifically, the film database 202 in French can have a database schema 210A in French and can include exemplary tables FILM 212A and REALISATEUR 212A, each with corresponding table names columns names, and instance values FILM 214A—(Id, Titre, and Sortie) 216A (XX, AVATAR, 2009) 218A and REALISATEUR 214A—(Id, Nom, and Naissance) 216A (XX, James Francis Cameron, and 16 août, 1954). Other variations and combinations of database schemas, tables and columns are contemplated with embodiments described herein.

A database adaptation component can translate entities (e.g., table names and column names) but not instance values of the French database schema and database to generate a translated database schema model 210B. The translated database schema model 210B can include translated table names and column names for the FILM 214A and REALISATEUR 214A to FILM 214B and DIRECTOR 214B. A predetermined number of top translations (e.g., two translations) can be requested for each translation, such that, the original entity is associated with the two translations. In this case, FILM 214A can be associated with Film and Movies, REALISATEUR 214A can be associated with Director and Filmmaker. As shown, the column names 216A are translated to column names 216B, with each having the capacity to corresponding to the original entity and a predetermined number of translations when defined on the translated database schema 210B. The instance values 218A are not translated as shown in 218B. Additional English heuristics (e.g., synonyms and phrasings), as discussed above, can be applied the translated database schema, specifically, the entity translations.

A query component can implement a query interface 220 that implements a search field 222, as an exemplary method for receiving queries. The search field 222 can be used to receive a query 230, for example, "films réalisés par james cameron" in French (i.e., the query natural language). The query component can translate the query based on selectively translating portions of the query, based at least in part on the translated database schema 210B and the database instance values 218. In operation, a determination is made whether query terms or tokens match the entities or the instance values in the translated database schema 210b and the film database, respectively, such that the query terms are excluded from translation.

In this case, the query—the terms detected include "films" (table name match) and james cameron (instance value match). A language scaling query including the query and a dynamic dictionary is generated as:

<mstrans:dictionary translation="films">films</mstrans:dictionary>
   realises par
<mstrans:dictionary translation="james cameron">james cameron</mstrans:dictionary>

The terms "film" and "james cameron" are excluded from translation using a markup language that is used to generate the language scaling query. In this regard, the machine translation service can be configured to understand the language scaling query and provide translations for the terms identified for translation and exclude the terms identified to be excluded from translation based on the markup language. The language scaling query can be communicated to a machine translation component to translate the non-excluded portions of the query (e.g., reaslises par).

Upon receiving the translation from the machine translation service, the translated query is generated as a hybrid utterance—"films directed by james cameron" where "film" and "james cameron" are not translated. The translated query can be communicated to an NLPS component to execute the search on the French database 100 while leveraging the NLPS components in English and the English heuristics associated therewith. Instances in the database identified as meeting being responsive to the query are generated as query results 240 and communicated. For example, Avatar 242 can be identified as a search result.

Figure 3:
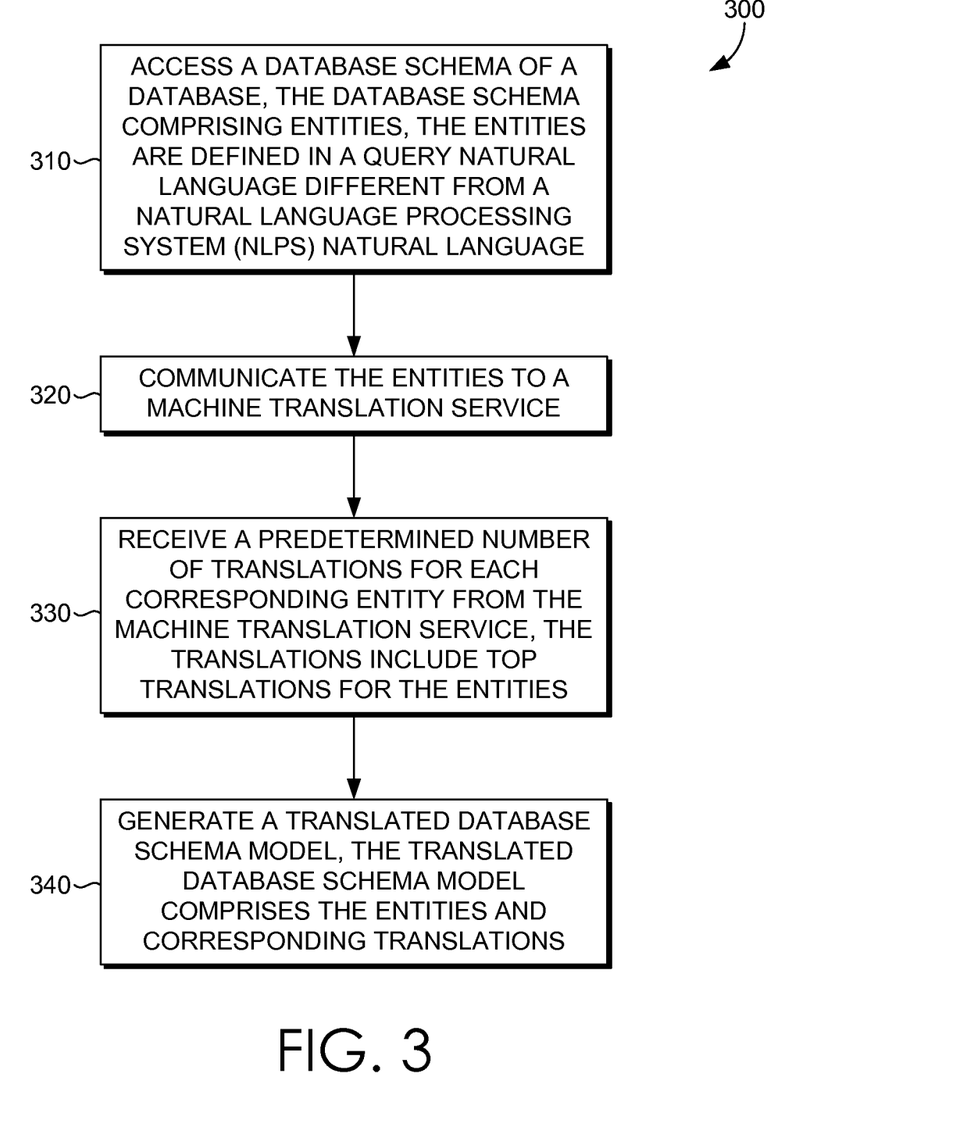
FIG. 3 a flow diagram showing an exemplary method for language scaling natural language processing systems, in accordance with embodiments described herein.

Turning now to FIG. 3, a flow diagram is provided that illustrates a method 300 for language scaling natural language processing system. Initially, at block 310, a database schema of a database is accessed. The database schema includes entities that are defined in a query natural language different from a natural language processing system (NLPS) natural language. The entities comprise table names and column names of the database schema. At block 320, the entities are communicated to a machine translation service. At block 330, a predetermined number of translations are received for each corresponding entity from the machine translation service, the translations include top translations for the entities. At block 340, a translated database schema model is generated, the translated database schema model comprises the entities and corresponding translations such that a query is executed for data in the database based on the translated database schema model.

Figure 4:
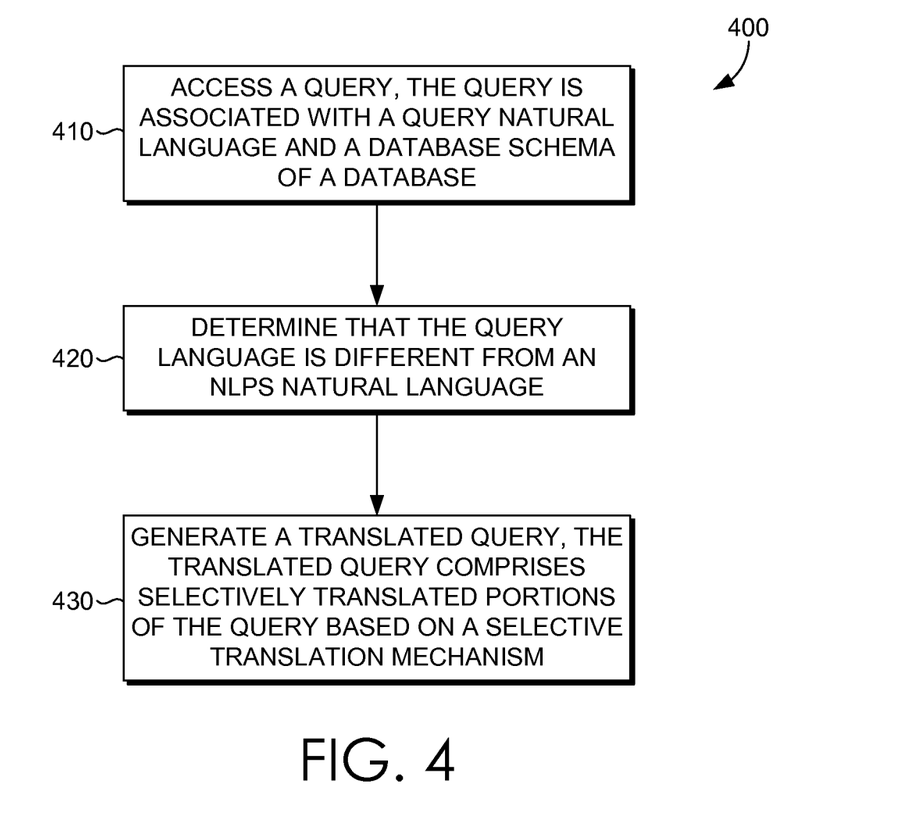
FIG. 4 a flow diagram showing an exemplary method for language scaling natural language processing systems, in accordance with embodiments described herein.

Turning now to FIG. 4, a flow diagram is provided that illustrates a method 400 for language scaling natural language processing systems (NLPS). Initially at block 410, a query is accessed, where the query is associated with a query natural language and a database schema of a database. At block 420, a determination that the query language is in a different from a NLPS natural language is made. At block 430, a translated query is generated, when the query natural language is different from the NLPS natural language a translated query. The translated query comprises selectively translated portions of the query based on a selective translation mechanism that includes accessing the machine translation service to translate selected portions of the query based on the database schema. At block 440, the translated query is executed on a natural language processing system to identify query results, where the query results are generated based on NLPS components in the NLPS language and the database schema.

Figure 5:
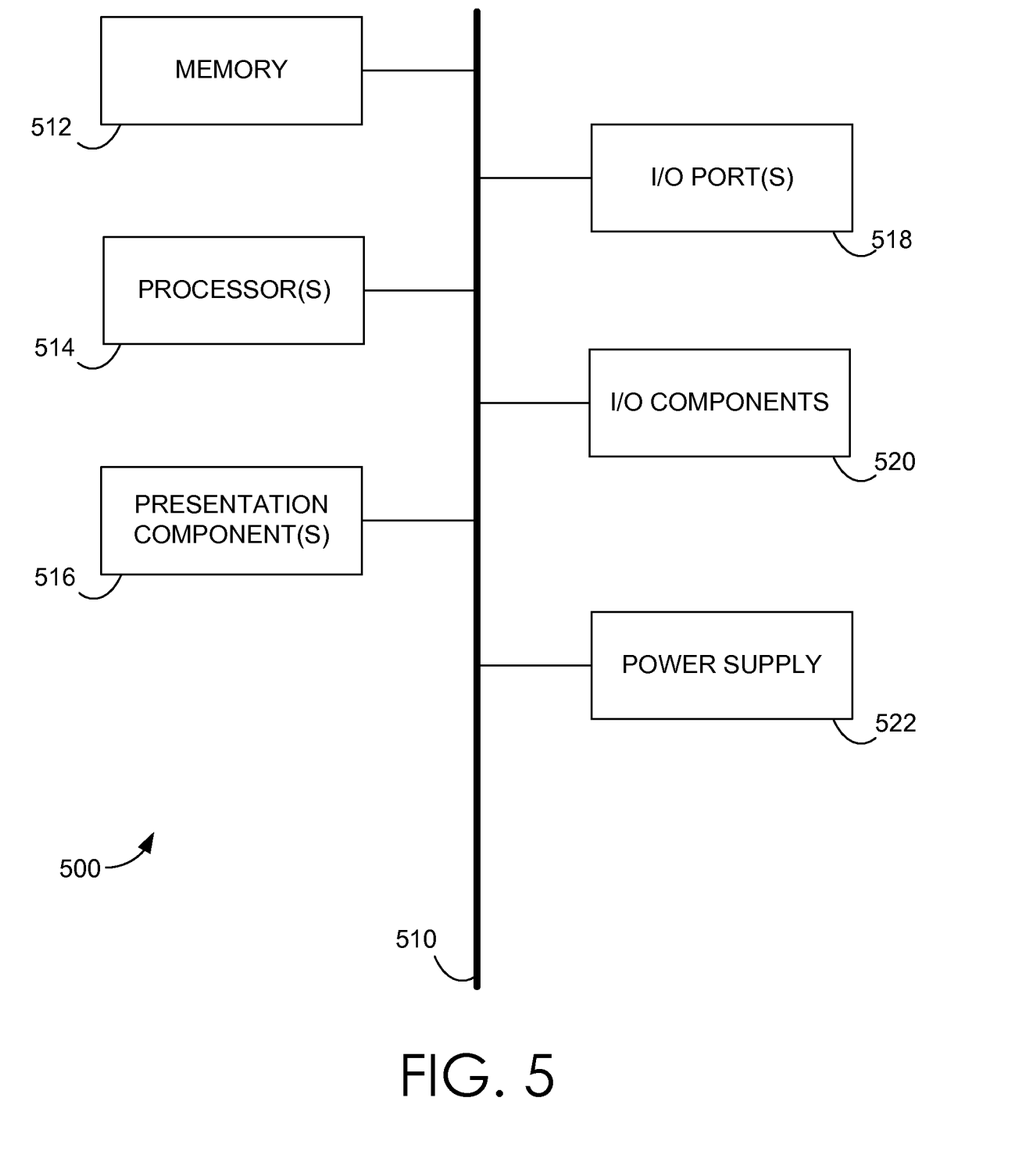
FIG. 5 is a block diagram of an exemplary computing environment suitable for use in implementing embodiments described herein.

Having briefly described an overview of embodiments of the present invention, an exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output ports 518, input/output components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A system for language scaling natural language processing systems, the system comprising:
 a processor and a memory configured for providing computer program instructions to the processor;
 a database schema adaptation component configured for:
  accessing a database schema of a database, the database schema is a relational model comprising entities, wherein the entities are defined in a query natural language different from a natural language processing system (NLPS) natural language;
  communicating the entities to a machine translation service;
  receiving translations for the entities from the machine translation service, wherein the translations correspond to top translations for the entities; and
  generating a translated database schema model, the translated database schema comprises translations from the query natural language to the NLPS natural language, wherein the translated database schema model comprises associations between the entities of the database schema and the corresponding translations of the translated database schema model, such that during query execution, the corresponding translations of the translated database schema model are referenced to find instances of the entities of the database schema that are responsive to queries to the database based on the translated database schema;

a query component configured for:

accessing a query, wherein the query is defined in the query natural language that is different from the NLPS natural language;

generating a translated query, wherein the translated query comprises selectively translated portions of the query based on a selective translation mechanism that includes communicating with the machine translation service to translate selected portions of the query; and executing the translated query on a natural language processing system to identify query results, wherein the query results are generated based on NLPS components in the NLPS language and the translated database schema model.

2. The system of claim 1, further comprising the machine translation service configured for:

receiving the entities comprising table names and column names;

translating the entities to determine a predetermined number of translations; and communicating the entities and the predetermined number of translations for each entity.

3. The system of claim 1, wherein the selective translation mechanism comprises:

comparing portions of the query to the entities in the translated database schema and instance values in the database;

identifying a portion of the query as a selected portion for translation based on not matching the portion with the entities and the instance values; and identifying a portion of the query as an excluded portion from translation based on matching the portion with an entity or an instance value.

4. The system of claim 2, wherein the predetermined number of translations include at least one semantically different translation such that the at least one semantically different translation is captured in the translated database schema model, wherein the NLPS components are configured to process the semantic elements of the corresponding translations of the entities in the translated database schema model.

5. The system of claim 2, wherein the translated database schema model is a modeled representation of the database schema for lookups of entities, wherein the translated database schema model includes the table names and corresponding top translations for the table names, the column names and corresponding top translations for the column names stored in a data structure.

6. The system of claim 3, wherein generating the translated query is based on generating a language scaling query, wherein the language scaling query comprises selected portions and excluded portions, wherein the selected portions and excluded portions are defined in a markup language.

7. The system of claim 3, further comprising the machine translation service configured for:

receiving at least the selected portions of the query for translation;

translating the selected portions of the query; and communicating translations for the selected portions of the query.

8. A computer-implemented method for language scaling natural language processing systems (NLPS), the method comprising:

accessing a database schema of a database, the database schema is a relational model comprising entities, the entities are defined in a query natural language different from a natural language processing system (NLPS) natural language, wherein the entities comprise table names and column names of the database schema;

communicating the entities to a machine translation service;

receiving a predetermined number of translations for each corresponding entity from the machine translation service, wherein the translations include top translations for the entities; and generating a translated database schema model, the translated database schema comprises translations from the query natural language to the NLPS natural language, wherein the translated database schema model comprises associations between the entities of the database schema and the predetermined number of translations of the translated database schema model, such that during query execution, the predetermined number of translations of the translated database schema model are referenced to find instances of the entities in the database schema that are responsive to queries to the database.

9. The method of claim 8, wherein accessing the database schema further comprises normalizing the entities, wherein normalizing the entities formats the entities into a normal form for the machine translation service.

10. The method of claim 8, wherein translation of the entities is based on:

receiving entities comprising table names and column names;

translating the entities to determine the predetermined number of translations; and communicating the entities and the predetermined number of translations for each entity.

11. The method of claim 8, wherein the translated database schema model is a modeled representation of the database schema for lookups of entities, wherein the translated database schema model includes the table names and corresponding top translations for the table names, the column names and corresponding top translations for the column names stored in a data structure.

12. The method of claim 8, further comprising performing NLPS natural language heuristic operations on translated entities in the translated database schema model, wherein the NLPS natural language heuristic operations include rules that define additional dimensions for the predetermined number of translations of the entities.

13. One or more computer storage media having computer-executable instructions embodied thereon that, when executed, by one or more processors, cause the one or more processors to perform a method for language scaling natural language processing systems (NLPS), the method comprising:

accessing a query, wherein the query is associated with a query natural language, a database schema of a database, and a translated database schema model comprising translations from the query natural language to the NLPS natural language, wherein the translated database schema model comprises associations between the entities of the database schema and corresponding translations of the entities in the database schema, such that during query execution, the corresponding translations of the translated database schema model are referenced to find instances of the entities in the database schema that are responsive to queries to the database;

determining that the query natural language is different from a NLPS natural language;

generating a translated query, wherein the translated query comprises selectively translated portions of the query based on a selective translation mechanism that includes accessing a machine translation service to translate selected portions of the query based on the database schema; and executing the translated query on a natural language processing system to identify query results, wherein the query results are generated based on NLPS components in the NLPS language and the database schema.

14. The media of claim 13, wherein the translated database schema model is generated based on:

accessing the database schema comprising the entities, wherein the entities are in the query natural language different from the NLPS natural language;

communicating the entities to a machine translation service, wherein the entities comprise table names and column names of the database schema;

receiving a predetermined number of translations for each corresponding entity, wherein the translations correspond to top translations for the entities; and generating the translated database schema model, wherein the translated database schema model comprises associations between the entities and the corresponding translations.

15. The media of claim 13, wherein the translated database schema model is a modeled representation of the database schema for lookups of entities, wherein the translated database schema model includes the table names and corresponding top translations for the table names, the column names and corresponding top translations for the column names stored in a data structure.

16. The media of claim 13, wherein when the query natural language is not different from the NLPS natural language, the query is executed on the NLPS to identify query results, wherein the query results are generated based on NLPS components in the NLPS language.

17. The media of claim 13, wherein the selective translation mechanism comprises:

comparing portions of the query to the entities in the translated database schema and instance values in the database;

identifying a portion of the query as a selected portion for translation based on not matching the portion with the entities and the instance values; and identifying a portion of the query as an excluded portion from translation based on matching the portion with an entity or an instance value.

18. The media of claim 13, wherein generating the translated query is based on generating a language scaling query, wherein the language scaling query comprises selected portions and excluded portions, wherein the selected portions and excluded portions are defined in a markup language.

19. The media of claim 13, wherein the translated query is generated based on alignment information such that the translated query comprises one or more portions of maintained translations or reversed translations based on a position of the one or more words, wherein alignment information indicates how each word in the translation query aligns with original word positions.

20. The media of claim 13, wherein the NLPS components in the NLPS natural language executing a translated query include at least one of a query interpretation component, a query enhancement component, and an entity mapping component.

* * * * *